US012458988B2

(12) United States Patent
Wang et al.

(10) Patent No.: US 12,458,988 B2
(45) Date of Patent: Nov. 4, 2025

(54) WATER OUTLET MECHANISM

(71) Applicant: Xiamen Lota International Co., Ltd., Fujian (CN)

(72) Inventors: Xuedong Wang, Fujian (CN); Jinyong Chen, Fujian (CN); Xiaofei Guo, Fujian (CN); Chuanbao Zhu, Fujian (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 353 days.

(21) Appl. No.: 17/969,866

(22) Filed: Oct. 20, 2022

(65) Prior Publication Data

US 2023/0173512 A1 Jun. 8, 2023

(51) Int. Cl.
*B05B 3/16* (2006.01)
*B05B 1/18* (2006.01)
*B05B 15/654* (2018.01)

(52) U.S. Cl.
CPC ................ *B05B 3/16* (2013.01); *B05B 1/185* (2013.01); *B05B 15/654* (2018.02)

(58) Field of Classification Search
CPC ........... B05B 1/18; B05B 1/185; B05B 3/025; B05B 3/028; B05B 3/04; B05B 3/0409; B05B 3/0418; B05B 3/0422; B05B 3/0427; B05B 3/0445; B05B 3/14; B05B 3/16; B05B 15/654
See application file for complete search history.

(56) References Cited

U.S. PATENT DOCUMENTS

| | | | | |
|---|---|---|---|---|
| 4,018,385 | A * | 4/1977 | Bruno | B05B 3/008 239/548 |
| 2006/0157590 | A1* | 7/2006 | Clearman | B05B 3/0459 239/533.13 |
| 2014/0008462 | A1* | 1/2014 | Gransow | B05B 1/14 239/391 |
| 2015/0115067 | A1* | 4/2015 | Lin | B05B 1/18 239/548 |
| 2016/0228887 | A1* | 8/2016 | Lin | B05B 3/0463 |
| 2016/0296950 | A1* | 10/2016 | Tian | B05B 3/0422 |
| 2020/0038885 | A1* | 2/2020 | Wu | B05B 3/16 |
| 2020/0086335 | A1* | 3/2020 | Wu | B05B 1/185 |
| 2020/0179958 | A1* | 6/2020 | Fan | B05B 1/185 |
| 2023/0009593 | A1* | 1/2023 | Chen | B05B 1/185 |

FOREIGN PATENT DOCUMENTS

| | | |
|---|---|---|
| CN | 105170352 A | 12/2015 |

* cited by examiner

*Primary Examiner* — Darren W Gorman
(74) *Attorney, Agent, or Firm* — Cooper Legal Group, LLC

(57) ABSTRACT

The present disclosure discloses a water outlet mechanism comprising a water outlet body, a driving assembly, an eccentric cam, a swinging plate, and one or more water outlet nozzles. The water outlet body comprises a water inlet port, a water outlet port, and a water-passing cavity in communication with the water inlet port and the water outlet port. The driving assembly is disposed in the water-passing cavity. The eccentric cam is rotatably disposed in the water-passing cavity and is operatively coupled to the driving assembly. The swinging plate is swingingly disposed in the water-passing cavity and is operatively coupled to the eccentric cam. The one or more water outlet nozzles are swingingly disposed on the swinging plate and are configured to be driven by the swinging plate to perform reciprocating movement of swinging in a front-and-rear direction.

8 Claims, 7 Drawing Sheets

WATER OUTLET MECHANISM

RELATED APPLICATIONS

This application claims priority to Chinese patent application number 202123076353.4, filed on Dec. 8, 2021. Chinese patent application number 202123076353.4 is incorporated herein by reference.

FIELD OF THE DISCLOSURE

The present disclosure relates to a water outlet mechanism.

BACKGROUND OF THE DISCLOSURE

At present, most water outlet mechanisms, such as kitchen shower heads, shower nozzles, and shower heads, on the market have various forms of functional water for selection, such as blade water, direct spraying water, massage water, spray water, and the like, and the functional water in each form has different bathing effects.

The existing water outlet mechanisms have a fixed water outlet direction, which only has a single function. Therefore, the water outlet effect of the dynamic water bloom is realized in the existing technologies. At present, there are some water outlet devices which can realize swinging of water output by water outlet pressure. For example, the Chinese patent number 201510522819.9 discloses a dynamic water outlet nozzle. Water is fed through a diverter, and a rotor is driven to rotate. A magnet on a body and a magnet on a water outlet body cooperate with each other to enable the water outlet body to deflect towards a same direction. When a magnet on the rotor rotates to a position at which the magnet on the water outlet body generates magnetism, the water outlet body moves towards an opposite position of an original direction, so that a splash swings in a left-and-right direction in a water outlet process. However, the water outlet mechanism with the dynamic spray is complex in structure and high in manufacturing cost.

BRIEF SUMMARY OF THE DISCLOSURE

The present disclosure provides a water outlet mechanism to solve the deficiencies in the background. A technical solution of the present disclosure is as follows.

A water outlet mechanism comprises a water outlet body, a driving assembly, an eccentric cam, a swinging plate, and one or more water outlet nozzles. The water outlet body comprises a water inlet port, a water outlet port, and a water-passing cavity in communication with the water inlet port and the water outlet port. The driving assembly is disposed in the water-passing cavity, and the eccentric cam is rotatably disposed in the water-passing cavity and is operatively coupled to the driving assembly. The swinging plate is disposed in the water-passing cavity and is operatively coupled to the eccentric cam, and the one or more water outlet nozzles are swingingly disposed on the swinging plate and are configured to be driven by the swinging plate to perform reciprocating movement of swinging in a front-and-rear direction.

In a preferred embodiment, a direction of reciprocating movement of the swinging plate is the same as a direction of the reciprocating movement of the one or more water outlet nozzles.

In a preferred embodiment, the swinging plate comprises a transmission slot operatively coupled to the eccentric cam, and an eccentric portion of the eccentric cam is disposed in the transmission slot, so that the swinging plate is driven to perform reciprocating movement in the front-and-rear direction when the eccentric cam is rotated.

In a preferred embodiment, the water-passing cavity comprises a position-guiding groove for guiding movement of the swinging plate, and the swinging plate is placed in the position-guiding groove and is configured to perform the reciprocating movement in the front-and-rear direction along the position-guiding groove.

In a preferred embodiment, the swinging plate comprises one or more swinging matching grooves, each of the one or more water outlet nozzles comprises a swinging shaft, and the swinging shaft is swingingly disposed in a corresponding one of the one or more swinging matching grooves.

In a preferred embodiment, the swinging plate further comprises one or more nozzle-limiting grooves extending therethrough, and a top end of each of the one or more water outlet nozzles extends into a corresponding one of the one or more nozzle-limiting grooves.

In a preferred embodiment, the driving assembly comprises an impeller, a speed reducer, and a rotating shaft, and the impeller, the speed reducer, and the rotating shaft are sequentially connected together. The impeller is adjacent to the water inlet port, the rotating shaft is adjacent to the water outlet port, and the rotating shaft is connected to the eccentric cam.

In a preferred embodiment, the water outlet mechanism further comprises a diverter. The diverter is located in the water-passing cavity and covers a periphery of the impeller, and the diverter comprises one or more oblique inlet openings.

Compared with the existing techniques, the technical solution has the following advantages.

1. The eccentric cam is driven to rotate by the driving assembly, and the eccentric cam drives the swinging plate to perform the reciprocating movement. The swinging plate drives the one or more water outlet nozzles to perform reciprocating movement of swinging in the front-and-rear direction, so that a dynamic water outlet function can be realized, more choices of water outlet functions can be realized, comfort and applicability of a splash are also increased, and an ornamental value of the splash is improved. Meanwhile, a transmission structure is simple, and a manufacturing cost is low.
2. Through the transmission cooperation of the eccentric portion of the eccentric cam and the transmission slot, the swinging plate can be driven to perform the reciprocating movement in the front-and-rear direction when the eccentric cam rotates. That is, a rotation of the eccentric cam is converted into a front-and-rear reciprocating movement of the swinging plate.
3. The swinging plate is arranged in the position-guiding groove and performs the reciprocating movement in the front-and-rear direction along the position-guiding groove. That is, the position-guiding groove can guide the front-and-rear reciprocating movement of the swinging plate.
4. The top end of each of the one or more water outlet nozzles extends into a corresponding one of the one or more nozzle-limiting grooves, and the one or more nozzle-limiting grooves can limit a swinging range of the one or more water outlet nozzles.

DETAILED DESCRIPTION OF THE EMBODIMENTS

Figure 1:
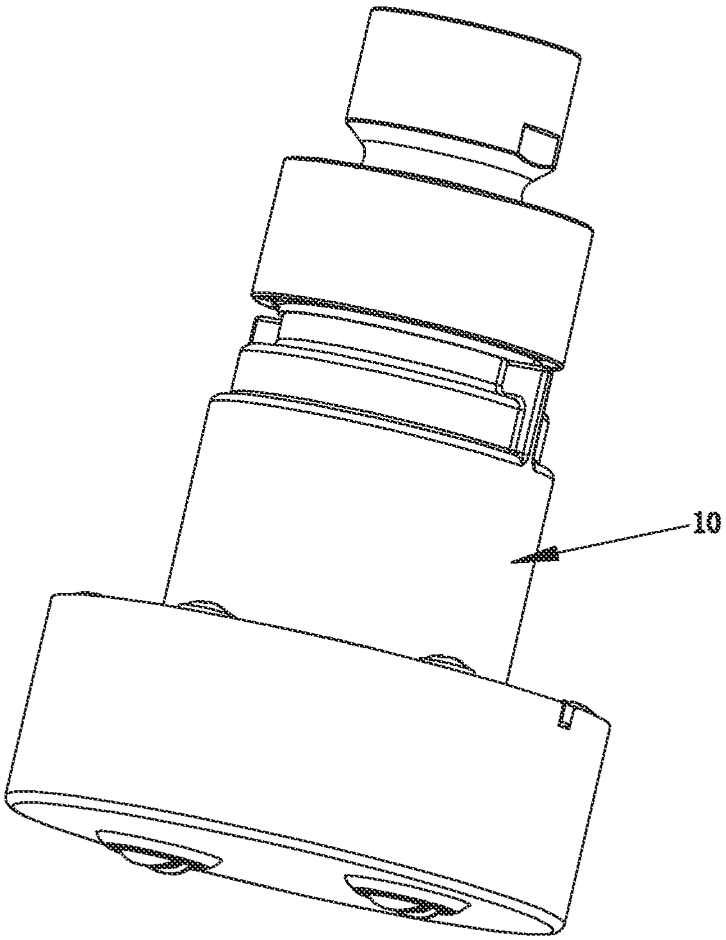
FIG. 1 illustrates a perspective view of a water outlet mechanism in a preferred embodiment.

The present disclosure will be further described below in combination with the accompanying drawings and embodiments.

Unless otherwise clearly defined in the claims, description, and the above-mentioned drawings of the disclosure, the terms “first”, “second”, “third”, and so on are used to distinguish different objects, not used to describe a specific order.

Unless otherwise clearly defined in the claims, description, and the above-mentioned drawings of the disclosure, for location words, such as the use of the terms “center”, “transverse”, “perpendicular”, “horizontal”, “vertical”, “top”, “bottom”, “inner”, “outer”, “upper”, “lower”, “front”, “rear”, “left”, “right”, “clockwise”, “counterclockwise”, and other indication orientations or positional relationships are based on the orientations and positional relationships shown in the drawings, are provided to facilitate the description of the disclosure and simplify the description, and are not intended to indicate or imply that the indicated device or element must have a specific orientation or be constructed and operated in a specific orientation. Such words should not be understood as limiting the specific protection scope of the disclosure.

In the claims, the description, and the drawings of the present disclosure, unless otherwise explicitly defined, if the term “fixed connection” or “fixedly connected” is used, it should be understood in a broad sense. That is, any connection method without displacement relationship and relative rotation relationship between the two, that is, including non-removable fixed connection, removably fixed connection, connected as a whole, and fixed connection through other devices or components.

In the claims, the description, and the drawings of the present disclosure, the terms “including”, “having”, and their variations are intended to mean “including but not limited to”.

Referring to FIGS. 1 to 9, a water outlet mechanism in a preferred embodiment is provided and comprises a water outlet body 10, a driving assembly, an eccentric cam 20, a swinging plate 30, and one or more water outlet nozzles 40.

The water outlet body 10 comprises a water inlet port, a water outlet port, and a water-passing cavity 11 in communication with the water inlet port and the water outlet port.

Figure 2:
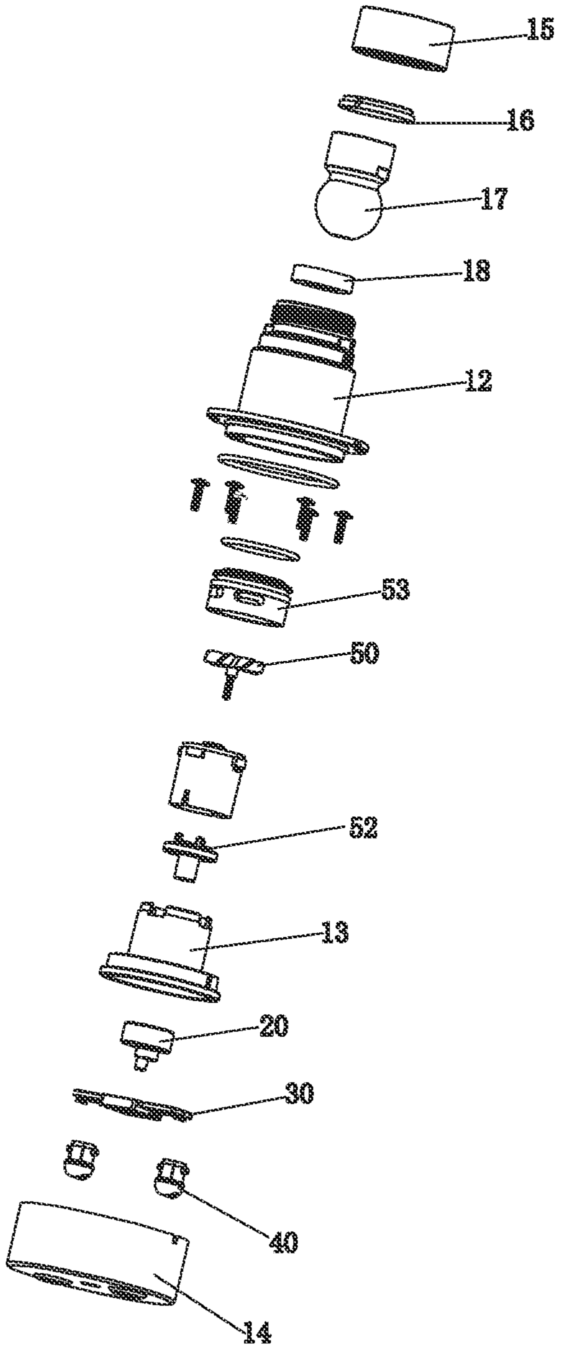
FIG. 2 illustrates a perspective exploded view of the water outlet mechanism in a preferred embodiment.

Referring to FIG. 2, the water outlet body 10 comprises a water outlet housing 12, a fixed seat 13, and a water outlet panel 14. The water outlet housing 12 and the water outlet panel 14 are locked together by screws and are sealed together to form the water-passing cavity 11 therebetween. A top end of the water outlet housing 12 is the water inlet port, and a nut 15, a bushing 16, a spherical head 17, and a sealing ring 18 are disposed at the water inlet port. The nut 15 is screwed with the water outlet housing 12 to inhibit axial movement of the spherical head 17 in the nut 15, and the bushing 16 and the sealing ring 18 are clamped between the spherical head 17 and the nut 15 and are arranged along an up-and-down direction. The fixed seat 13 is fixedly disposed in the water-passing cavity 11 for positioning the driving assembly.

The driving assembly is disposed in the water-passing cavity 11.

In this embodiment, the driving assembly comprises an impeller 50, a speed reducer 51, and a rotating shaft 52. The impeller 50, the speed reducer 51, and the rotating shaft 52 are sequentially connected together, the impeller 50 is adjacent to the water inlet port, and the rotating shaft 52 is adjacent to the water outlet port. The rotating shaft 52 is connected to the eccentric cam 20. The water outlet mechanism further comprises a diverter 53, and the diverter 53 is located in the water-passing cavity 11 and covers a periphery of the impeller 50. The diverter 53 comprises one or more oblique inlet openings.

Figure 3:
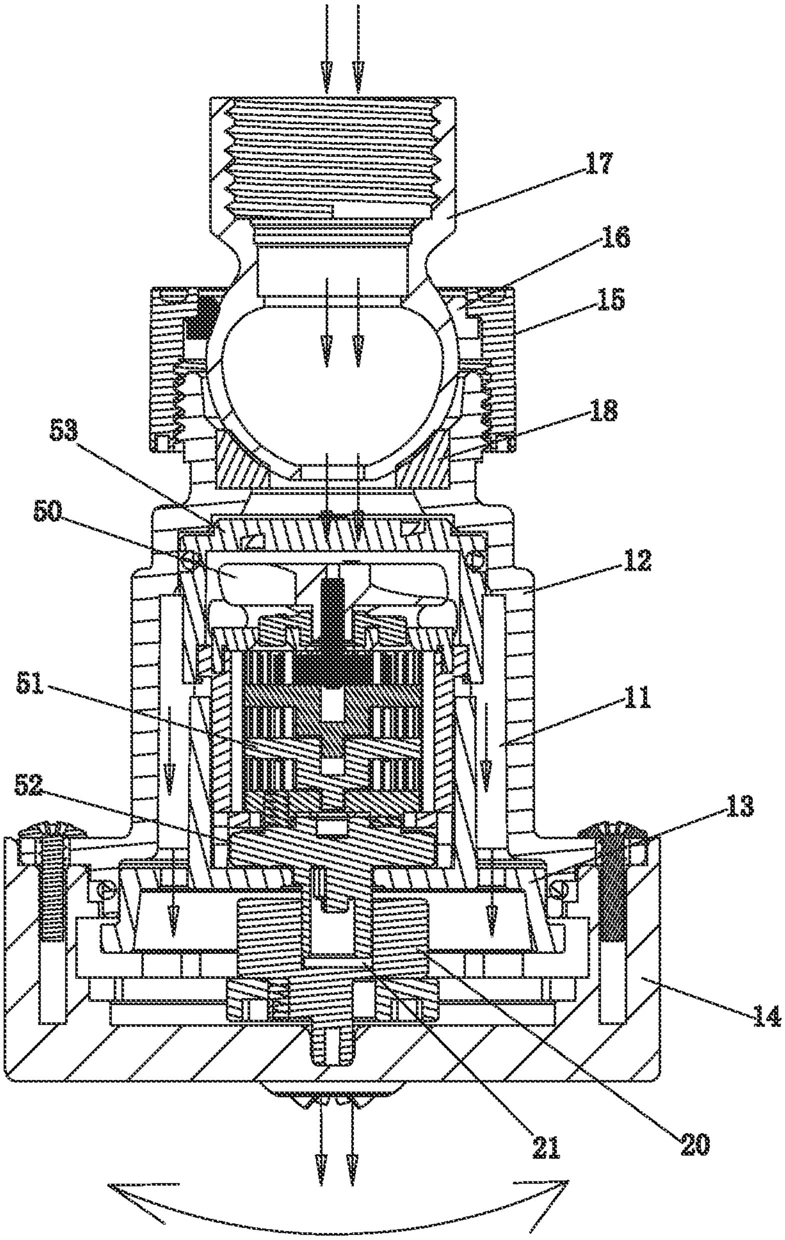
FIG. 3 illustrates a cross-sectional view of the water outlet mechanism in a preferred embodiment.
Figure 4:
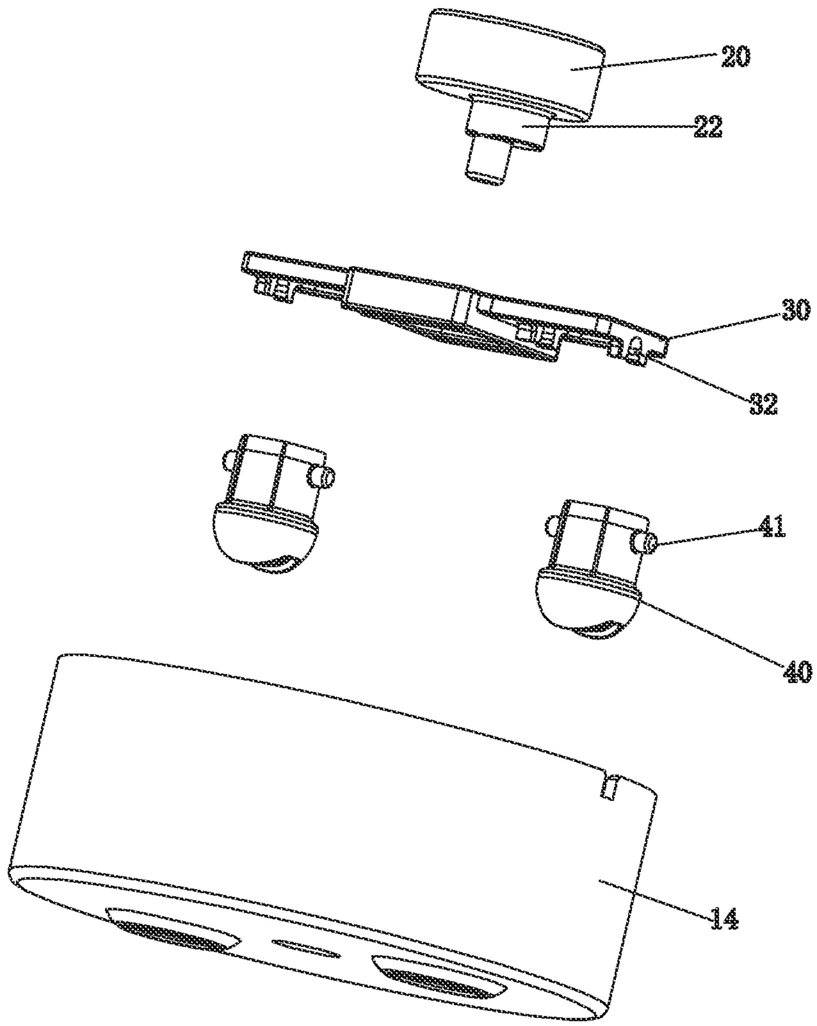
FIG. 4 illustrates a perspective view of an eccentric cam, a swinging plate, one or more water outlet nozzles, and a water outlet panel in a preferred embodiment, which are to be assembled together.

The eccentric cam 20 is rotatably disposed in the water-passing cavity 11 and is operatively coupled to the driving assembly. Referring to FIG. 3, a top end of the eccentric cam 20 comprises a slot 21, and a bottom end of the rotating shaft 52 is inserted into the slot 21. An eccentric portion 22 of the eccentric cam 20 is disposed at a lower end of the eccentric cam 20.

The swinging plate 30 is disposed in the water-passing cavity 11 and is operatively coupled to the eccentric cam 20.

In this embodiment, the swinging plate 30 comprises a transmission slot 31 operatively coupled to the eccentric cam 20, and the eccentric portion 22 of the eccentric cam 20 is disposed in the transmission slot 31, so that the swinging plate 30 is driven to perform reciprocating movement in a front-and-rear direction when the eccentric cam 20 is rotated. Specifically, referring to FIG. 6, the transmission slot 31 is rectangular, and when the eccentric portion 22 of the eccentric cam 20 contacts two long sides of the transmission slot 31, the eccentric portion 22 drives the swinging plate 30 to perform the reciprocating movement in the front-and-rear direction.

In this embodiment, the water-passing cavity 11 comprises a position-guiding groove 111 for guiding movement of the swinging plate 30, and the swinging plate 30 is placed in the position-guiding groove 111 and performs the reciprocating movement in the front-and-rear direction along the position-guiding groove 111. Specifically, the swinging plate 30 is substantially cross-shaped and comprises a protrusion 301 extending in the front-and-rear direction, and the position-guiding groove 111 is also cross-shaped and has a larger size than that of the swinging plate 30. The protrusion 301 is placed in the position-guiding groove 111 and is configured to perform the reciprocating movement in the front-and-rear direction along the position-guiding groove 111, so that the swinging plate 30 can perform the reciprocating movement in the front-and-rear direction within an enclosed range of the position-guiding groove 111.

The one or more water outlet nozzles 40 are swingingly disposed on the swinging plate 30 and driven by the swinging plate 30 to perform reciprocating movement of swinging in the front-and-rear direction.

In this embodiment, a direction of reciprocating movement of the swinging plate 30 is the same as a direction of the reciprocating movement of the one or more water outlet nozzles 40.

Figure 6:
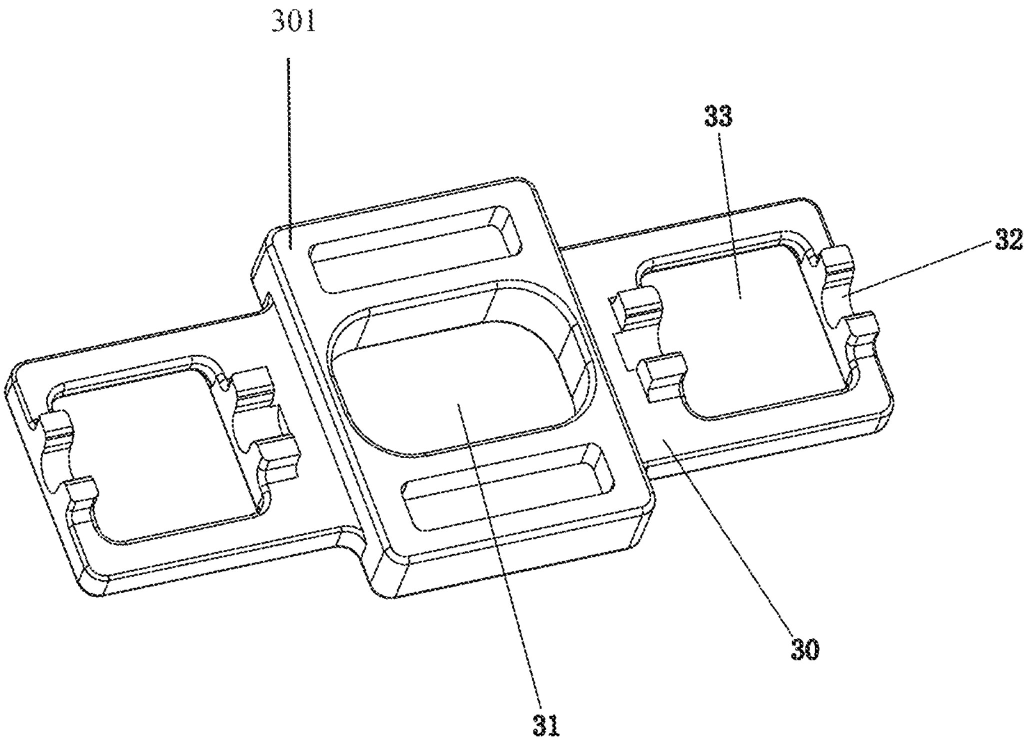
FIG. 6 illustrates a perspective view of a back side of the swinging plate in a preferred embodiment.

In this embodiment, the swinging plate 30 comprises one or more swinging matching grooves 32, each of the one or more water outlet nozzles 40 comprises a swinging shaft 41, and the swinging shaft 41 is swingingly disposed in the swinging matching grooves 32. Referring to FIG. 6, two of the one or more swinging matching grooves 32 corresponding to each of the one or more water outlet nozzles 40 are provided and located at two sides of a lower end of a corresponding one of one or more nozzle-limiting grooves 33. Each of the one or more swinging matching grooves 32 has an opening, and the swinging shaft 41 can be disposed in the one or more swinging matching grooves 32 from the opening thereof.

In this embodiment, the swinging plate 30 further comprises the one or more nozzle-limiting grooves 33 extending therethrough, and a top end of each of the one or more water outlet nozzles 40 extends into a corresponding one of the one or more nozzle-limiting grooves 33. Specifically, the number of the one or more nozzle-limiting grooves 33 is the same as that of the one or more water outlet nozzles 40, and the one or more nozzle-limiting grooves 33 can surround a periphery of the transmission slot 31.

Figure 5:
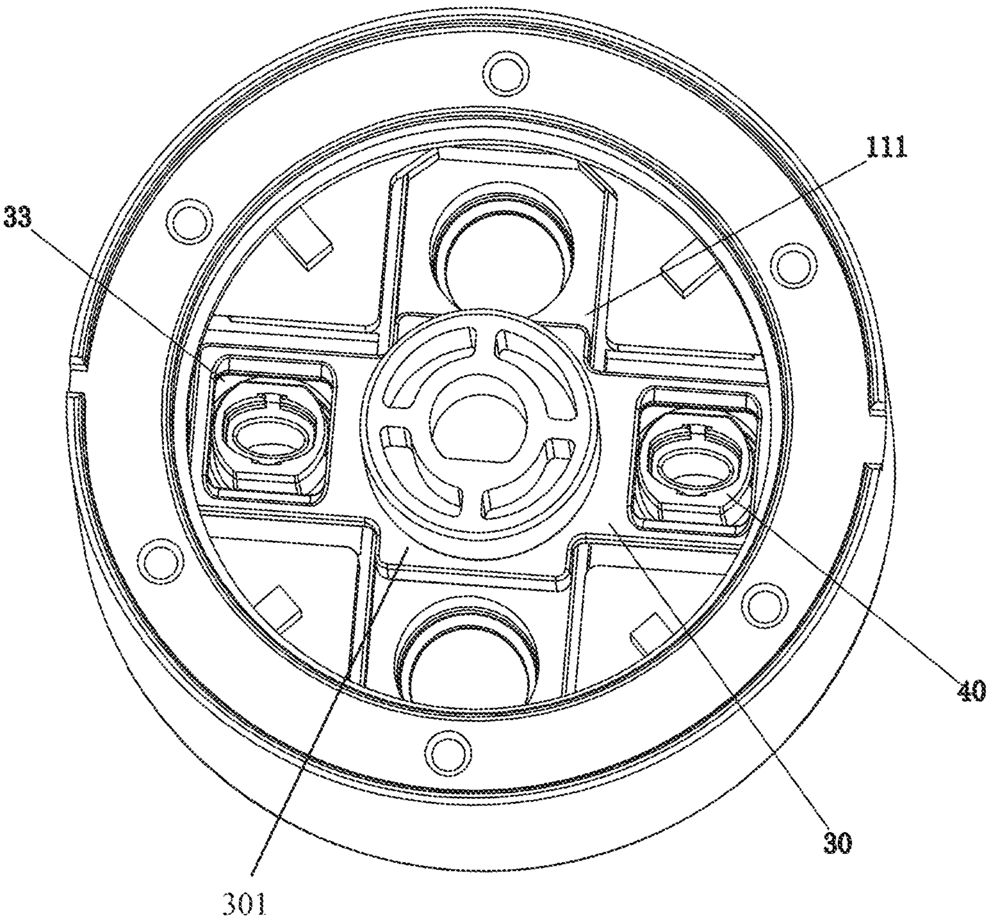
FIG. 5 illustrates a perspective view of the swinging plate and the water outlet panel in a preferred embodiment, which have been assembled together.
Figure 7:
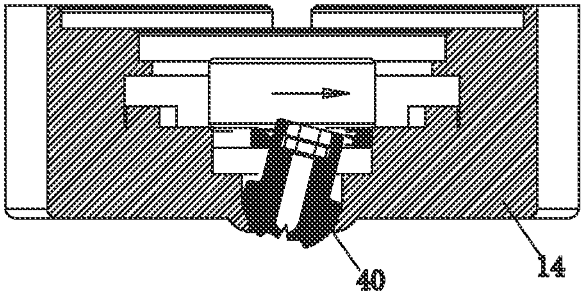
FIG. 7 illustrates a cross-sectional view of the water outlet mechanism in a preferred embodiment, when the swinging plate moves rearward and a bottom end of the one or more water outlet nozzles swings frontward.
Figure 8:
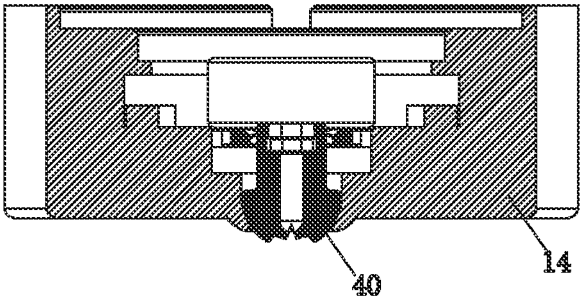
FIG. 8 illustrates a cross-sectional view of the water outlet mechanism in a preferred embodiment, when the swinging plate moves to a middle position and a bottom end of the one or more water outlet nozzles also swings to a middle position.
Figure 9:
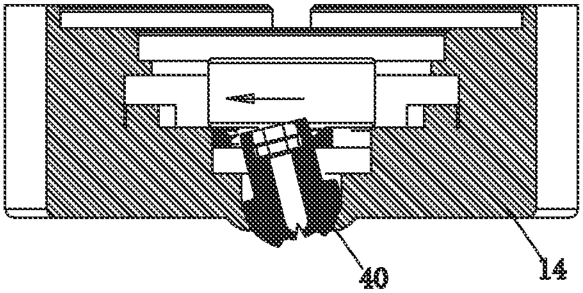
FIG. 9 illustrates a cross-sectional view of the water outlet mechanism in a preferred embodiment, when the swinging plate moves frontward and a bottom end of the one or more water outlet nozzles swings rearward.

Referring to FIG. 3, after entering from the water inlet port, water flows through the diverter 53 to drive the impeller 50 to rotate, and then is decelerated by the speed reducer 51 to drive the rotating shaft 52 to rotate. The rotating shaft 52 drives the eccentric cam 20 to rotate, and the eccentric portion 22 of the eccentric cam 20 is matched with the transmission slot 31 to drive the swinging plate 30 to perform the reciprocating movement in the front-and-rear direction. Referring to FIG. 5, the swinging plate 30 performs the reciprocating movement in the front-and-rear direction to drive the one or more water outlet nozzles 40 to swing in the front-and-rear direction. Referring to FIGS. 7 to 9, in FIG. 7, the swinging plate 30 moves rearward, the top end of each of the one or more water outlet nozzles 40 moves rearward under a driving of the swinging plate 30, and a bottom end of each of the one or more water outlet nozzles 40 swings frontward. Referring to FIG. 8, when the swinging plate 30 moves to a middle position, the one or more water outlet nozzles 40 are also in a middle position. When the swinging plate 30 moves to a front side as shown in FIG. 9, the top end of each of the one or more water outlet nozzles 40 moves frontward by the swinging plate 30, and the bottom end of each of the one or more water outlet nozzles 40 swings rearward.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A water outlet mechanism, comprising:

a water outlet body, a driving assembly, an eccentric cam, a swinging plate, and one or more water outlet nozzles, wherein:

the water outlet body comprises a water inlet port, a water outlet port, and a water-passing cavity in communication with the water inlet port and the water outlet port, the driving assembly is disposed in the water-passing cavity, the eccentric cam is rotatably disposed in the water-passing cavity and is operatively coupled to the driving assembly, the swinging plate is disposed in the water-passing cavity and is operatively coupled to the eccentric cam, a bottom side of the swinging plate comprises one or more swinging matching grooves, each of the one or more water outlet nozzles comprises a swinging shaft, and the swinging shaft is swingingly disposed in a corresponding one of the one or more swinging matching grooves to enable the swinging shaft to move synchronously with the swinging plate and is configured to be driven by the swinging plate to enable each of the one or more water outlet nozzles to perform reciprocating movement of swinging in a front-and-rear direction.

2. The water outlet mechanism according to claim 1, wherein:

a direction of reciprocating movement of the swinging plate is the same as a direction of the reciprocating movement of each of the one or more water outlet nozzles.

3. The water outlet mechanism according to claim 1, wherein:

the swinging plate comprises a transmission slot operatively coupled to the eccentric cam, and an eccentric portion of the eccentric cam is disposed in the transmission slot, so that the swinging plate is driven to perform reciprocating movement in the front-and-rear direction when the eccentric cam is rotated.

4. The water outlet mechanism according to claim 1, wherein:

the water-passing cavity comprises a position-guiding groove in the front-and-rear direction for guiding movement of the swinging plate, the swinging plate comprises a protrusion extending in the front-and-rear direction, and the protrusion is placed in the position-guiding groove and is configured to perform reciprocating movement in the front-and-rear direction along the position-guiding groove.

5. The water outlet mechanism according to claim 1, wherein:

the swinging plate further comprises one or more nozzle-limiting grooves extending through the swinging plate in a vertical direction, and a top end of each of the one or more water outlet nozzles extends into a corresponding one of the one or more nozzle-limiting grooves.

6. The water outlet mechanism according to claim 1, wherein:

the driving assembly comprises an impeller, a speed reducer, and a rotating shaft, the impeller, the speed reducer, and the rotating shaft are sequentially connected together, the impeller is adjacent to the water inlet port, the rotating shaft is adjacent to the water outlet port, and the rotating shaft is connected to the eccentric cam.

7. The water outlet mechanism according to claim 6, wherein:

the water outlet mechanism further comprises a diverter, the diverter is located in the water-passing cavity and covers a periphery of the impeller, and the diverter comprises one or more oblique inlet openings.

8. The water outlet mechanism according to claim 3, wherein:

the transmission slot is rectangular having two long sides and two shorter sides, and when the eccentric portion of the eccentric cam contacts the two long sides of the transmission slot, the eccentric portion drives the swinging plate to perform the reciprocating movement in the front-and-rear direction.

* * * * *